(12) United States Patent
Kitahora et al.

(10) Patent No.: US 6,900,469 B2
(45) Date of Patent: May 31, 2005

(54) LIQUID CRYSTAL DISPLAY ELEMENT

(75) Inventors: Takeshi Kitahora, Osaka (JP); Akihito Hisamitsu, Amagasaki (JP); Hideaki Ueda, Kishiwada (JP); Mitsuyo Matsumoto, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 41 days.

(21) Appl. No.: 09/957,167

(22) Filed: Sep. 19, 2001

(65) Prior Publication Data

US 2002/0039167 A1 Apr. 4, 2002

(30) Foreign Application Priority Data

Sep. 29, 2000 (JP) ........................................ 2000-298914

(51) Int. Cl.$^7$ ............................................... H01L 29/16
(52) U.S. Cl. .......................... 257/82; 257/98; 349/177; 349/179; 349/167; 349/168; 349/175
(58) Field of Search ................................. 349/167, 168, 349/175, 177, 179; 257/82, 98, 72, 79

(56) References Cited

U.S. PATENT DOCUMENTS

| | | | | |
|---|---|---|---|---|
| 4,659,182 A | * | 4/1987 | Aizawa | 349/82 |
| 5,126,868 A | * | 6/1992 | Kizaki et al. | 349/76 |
| 5,625,474 A | * | 4/1997 | Aomori et al. | 349/79 |
| 5,745,200 A | * | 4/1998 | Kikuchi et al. | 349/99 |
| 6,217,792 B1 | * | 4/2001 | Parri et al. | 252/299.61 |
| 6,221,543 B1 | * | 4/2001 | Guehler et al. | 430/7 |
| 6,287,646 B1 | * | 9/2001 | Takeuchi et al. | 428/1.1 |
| 6,287,647 B1 | | 9/2001 | Kobayashi et al. | 428/1.1 |
| 6,327,017 B2 | * | 12/2001 | Barberi et al. | 349/177 |
| 6,414,739 B2 | * | 7/2002 | Suzuki | 349/155 |
| 6,452,651 B1 | * | 9/2002 | Takami et al. | 349/88 |
| 6,509,948 B2 | * | 1/2003 | Suzuki | 349/155 |
| 6,519,013 B1 | * | 2/2003 | Nagai et al. | 349/33 |

* cited by examiner

Primary Examiner—George Eckert
Assistant Examiner—Eugene Lee
(74) Attorney, Agent, or Firm—Sidley Austin Brown & Wood LLP

(57) ABSTRACT

Disclosed is a liquid crystal display apparatus comprising a pair of substrates and a liquid crystal layer provided between the substrates, the liquid crystal layer containing a liquid crystal composition that exhibits a cholesteric phase. The liquid crystal composition contains a mixture of a chiral material and nematic liquid crystal. The liquid crystal display layer is configured to satisfies the following conditions:

a viscosity a [cP] of the liquid crystal composition is in a range from 30 to 150;

a dielectric anisotropy b of the liquid crystal composition is in a range from 5 to 50;

a thickness c [$\mu$m] of the liquid crystal layer is in a range from 3 to 8; and a product of a, b, and c is not less than 3500.

19 Claims, 5 Drawing Sheets

| Ex. # | Liquid Crystal | | | | | | Drive Voltage [V] | | Y value | | Contrast |
|---|---|---|---|---|---|---|---|---|---|---|---|
| | Components | Color | a [cP] | b | c [μm] | axbxc | For transparent state | For Max. Y Value in Colored | Transparent State | Colored State | |
| 1 | P+i+ii | B | 100 | 23.7 | 6 | 14220 | 20 | 35 | 1.56 | 7.49 | 4.8 |
| 2 | Q+i+ii+iii | B | 135 | 16.4 | 3 | 6642 | 25 | 36 | 1.53 | 8.08 | 5.28 |
| 3 | Q+i+ii | G | 100 | 15.9 | 5 | 7950 | 24 | 38 | 1.68 | 16.53 | 9.84 |
| 4 | Q+i+iv | G | 100 | 17.2 | 5 | 8600 | 25 | 39 | 1.76 | 20.48 | 11.64 |
| 5 | R+v | R | 58 | 18.3 | 4 | 4246 | 20 | 36 | 1.54 | 6.5 | 4.22 |
| 6 | Q+i+iii | R | 85 | 17.1 | 5 | 7268 | 24 | 40 | 1.9 | 7.32 | 3.85 |
| 7 | S+iii+iv | G | 50 | 19.9 | 4 | 3980 | 28 | 39 | 1.72 | 19.31 | 11.23 |
| 8 | T+vi+vii | B | 37 | 35.2 | 8 | 10419 | 31 | 40 | 1.54 | 7.49 | 4.86 |
| 9 | U+i+vi | R | 142 | 28.9 | 8 | 32830 | 30 | 40 | 1.94 | 6.26 | 3.23 |

| Comp. Ex. # | Liquid Crystal | | | | | | Drive Voltage [V] | Y value | | Contrast | Drive Voltage [V] For Max. Y Value in Colored State |
|---|---|---|---|---|---|---|---|---|---|---|---|
| | Components | Color | a [cP] | b | c [μm] | axbxc | Transparent/Colored | Transparent State | Colored State by 40 V | | |
| 1 | V+i+ii | B | 43 | 6.85 | 5 | 1473 | 24/40 | 1.39 | 4.48 | 3.22 | 60 |
| 2 | W+i+ii | G | 64 | 6.67 | 4.5 | 1921 | 28/40 | 1.39 | 10.51 | 7.56 | 60 |
| 3 | X+i+ii | R | 53 | 6.83 | 4 | 1448 | 30/40 | 1.72 | 3.53 | 2.05 | 100 |
| 4 | Y+i+ii | B | 65 | 11.5 | 4.5 | 3364 | 25/40 | 1.57 | 4.51 | 2.87 | 55 |

LIQUID CRYSTAL DISPLAY ELEMENT

CROSS-REFERENCE TO RELATED APPLICATION

This application is based on Japanese Patent Application No. 2000-298914 filed in Japan on Sep. 29, 2000, the entire content of which is hereby incorporated by reference.

BACKGROUND OF THE INVENTION

1. Field of the Invention

The present invention relates to a liquid crystal display element, and particularly relates to a liquid crystal display element containing a liquid crystal component exhibiting a cholesteric phase at room temperature.

2. Description of the Related Art

A liquid crystal display (LCD) element is basically composed of a pair of substrates having transparent electrodes and a liquid crystal layer provided between the substrates. The arrangement of liquid crystal molecules is controlled by application of a predetermined driving voltage to the liquid crystal layer, so that external light incident to the liquid crystal element is modulated. By so doing, intended image display, and the like, is carried out. In some cases, the LCD element may include space maintaining members between the substrates so that a space between the substrates is maintained.

Various types of such LCD elements have been proposed, and recently studied are various types of LCD elements utilizing chiral nematic liquid crystal to which a chiral material is added so as to exhibit a cholesteric phase at room temperature.

Such an LCD element is sometimes used as, for instance, a reflective LCD element utilizing the selective reflection function of chiral nematic liquid crystal in some cases. In this reflective LCD element, for display, the state of liquid crystal is switched between a planer state (colored state obtained by selectively reflecting visible light with specific wavelengths) and a focal conic state (transparent state) in response to application of high and low pulse voltages. Further, a region in the planer state remains in the planer state while a region in the focal conic state remains in the focal conic state even after pulse voltage application (this maintenance of the respective planer and focal conic states is generally referred to as bistability or memory effect) and (with this bistability or memory effect) it is possible to maintain the obtained display even after voltage application is stopped.

Furthermore, as a method for realizing full-color display with an LCD element of this type, a method is taken as an example that utilizes a multi-layer LCD element having three layers, namely, a red (R) liquid crystal layer for red color display, a green (G) liquid crystal layer for green color display, and a blue (B) liquid crystal layer for blue color display is taken as an example.

As to an LCD element having, between a pair of substrates, a liquid crystal layer containing chiral nematic liquid crystal, the driving of the same has required application of a driving voltage of around 60 V in the prior art, and hence, an LCD device that is driven with a lower driving voltage is demanded. It is particularly necessary to provide an LCD element that is driven with a driving voltage of not higher than about 40 V so that an inexpensive universal driving IC is used as the driving IC for driving the LCD element.

To drive the LCD element at a lower voltage, the liquid crystal layer may be formed thinner. This, however, causes the light reflectance to decrease, thereby darkening image display and hence deteriorating contrast.

SUMMARY OF THE INVENTION

Therefore, it is a main object of the present invention to provide an improved LCD device.

Further, it is an object of the present invention is to provide an LCD element that has a pair of substrates and, between the substrates, a liquid crystal layer containing a liquid crystal composition that exhibits a cholesteric phase at room temperature, that is driven in response to application of a voltage to the liquid crystal layer, particularly a low voltage, and that is capable of obtaining a great light reflectance and a high contrast.

Furthermore, it is an object of the present invention to provide a multi-layer LCD element in which a plurality of liquid crystal layers are laminated and provided between a pair of substrates, that is driven with a low voltage, and that provides bright and excellent-contrast display.

According to the studies by the inventors of the present invention, in an LCD element that has, between a pair of substrates, a liquid crystal layer that contains a liquid crystal composition that exhibits a cholesteric phase at room temperature (or normal temperature) and that is driven in response to application of a voltage to the liquid crystal layer, if a mixture containing a chiral material and nematic liquid crystal is used as the liquid crystal composition, the liquid crystal layer is required to have a thickness at a certain level or more with a view to suppression of deterioration of the light reflectance and contrast in image display, as well as suppression of dielectric breakdown.

Furthermore, a material that exhibits great intermolecular polarization could be used as the liquid crystal material for the liquid crystal composition, so that the LCD element is driven with a low voltage. In this case, the foregoing liquid crystal composition has a great dielectric anisotropy $\Delta\in$. Here, a viscosity of the liquid crystal composition tends to decrease as the dielectric anisotropy $\Delta\in$ decreases, and to increase as the dielectric anisotropy $\Delta\in$ increases. Therefore, when the dielectric anisotropy $\Delta\in$ of the liquid crystal composition is excessively increased, this causes the viscosity to increase, and an excessively increased viscosity raises problems such as deterioration of responsibility to application of a driving voltage.

Then, the inventors of the present invention further studied the viscosity [cP (centi-poise)] and the dielectric anisotropy $\Delta\in$ of the liquid crystal composition, and the thickness [$\mu$m] of the liquid crystal layer, and discovered that the driving with a low voltage, a great optical reflectance, and a high contrast are achieved without deteriorating the responsibility to application of a driving voltage when the viscosity of the liquid crystal composition is 30 [cP] to 150 [cP], the dielectric anisotropy $\Delta\in$ of the liquid crystal composition is 5 to 50, the thickness [$\mu$m] of the liquid crystal layer is 3 [$\mu$m] to 8 [$\mu$m], and a product of these is not less than 3500.

Based on this knowledge, the inventors completed the present invention.

More specifically, an LCD element according to one aspect of the present invention includes a pair of substrates (usually a pair of substrates one of which is transparent) and a liquid crystal layer provided between the substrates, the liquid crystal layer containing a liquid crystal composition that exhibits a cholesteric phase (at room temperature or normal temperature), the LCD element being driven by application of a voltage to the liquid crystal layer, wherein:

the liquid crystal composition contains a mixture of a chiral material and nematic liquid crystal;

a viscosity a [cP] of the liquid crystal composition satisfies $30 \leq a \leq 150$;

a dielectric anisotropy b of the liquid crystal composition satisfies $5 \leq b \leq 50$;

a thickness c [μm] of the liquid crystal layer satisfies $3 \leq c \leq 8$; and a product of a, b, and c is not less than 3500.

The LCD element configured as described above is applicable as a reflective LCD element that utilizes selective reflection of liquid crystal that exhibits a cholesteric phase (at room temperature or normal temperature).

The LCD element according to the present invention, when used as a reflective LCD element, carries out display by switching the state of liquid crystal between a planer state (colored state) and a focal conic state (transparent state) depending on which voltage is applied, e.g., a high voltage or a low voltage.

According to the LCD element thus configured, the liquid crystal composition is a chiral nematic liquid crystal composition containing a mixture of a chiral material and a nematic liquid crystal. The viscosity a [cP] and dielectric anisotropy ($\Delta \in$) b of the liquid crystal composition and the thickness c [μm] of the liquid crystal layer are in ranges satisfying $30 \leq a \leq 150$, $5 \leq b \leq 50$, and $3 \leq c \leq 8$, respectively. Besides, the product of a, b, and c is not less than 3500. Therefore, the LCD element is driven with a low voltage, and is capable of obtaining a great light reflectance and a high contrast.

The product of a, b, and c of not less than 3500 suffices, and it is more preferable that the product is not less than 5000. An upper limit of the product of a, b, and c is, for instance, approximately 35000.

In the case where the product of a, b, and c is less than 3500, or in the case where the product of a, b, and c is more than 35000, it is difficult to lower the driving voltage while maintaining excellent display characteristics and responsibility to a driving voltage.

In other words, when the thickness c of the above liquid crystal layer is excessively decreased, problems such as decreases in the light reflectance and the contrast and dielectric breakdown could occur. Therefore, taking these problems into consideration, the decrease of the thickness c of the above liquid crystal layer has limitation. Accordingly, in decreasing the product of a, b, and c, the viscosity a and dielectric anisotropy ($\Delta \in$) b of the liquid crystal composition are dominant. However, both the viscosity and dielectric anisotropy $\Delta \in$ of the liquid crystal composition tend to decrease together at the same time, as described above. In other words, when the viscosity decreases, the dielectric anisotropy $\Delta \in$ hardly increases. Therefore, in the case where the product of a, b, and C is less than 3500, both the viscosity a and dielectric anisotropy ($\Delta \in$) b of the liquid crystal composition tend to decrease together, and it becomes more difficult to lower the driving voltage as the dielectric anisotropy ($\Delta \in$) b decreases.

Furthermore, as described above, with a view to suppressing deterioration of the responsibility to application of a driving voltage when the viscosity a excessively increases, the increase of the viscosity a and the dielectric anisotropy $\Delta \in$ is limited. Therefore, in increasing the product of a, b, and C, the thickness C of the liquid crystal layer is dominant. Accordingly, in the case where the product of a, b, and c is more than 35000, the thickness c of the liquid crystal layer excessively increases, and it becomes difficult to lower the driving voltage as the thickness c of the liquid crystal layer increases.

The LCD element according to the foregoing configuration can be driven with a low voltage, which is, for instance, not more than approximately 40 V. In this case, a common, inexpensive IC is adaptable as a driving IC for driving the LCD element.

In the LCD element according to the foregoing configuration, space maintaining members may be provided between the substrates so as to maintain a distance between the pair of substrates. The space maintaining members are, for instance, spaces and resin structures. The spacers and resin structures will be explained in detail in the "PREFERRED EMBODIMENTS" part below.

In any case, it is difficult to obtain the desired chiral nematic liquid crystal that can exhibit a cholestric phase, both when the content of the chiral material is excessively less and when it is excessively much. Therefore, the content of the chiral material in the liquid crystal composition preferably ranges from 7 wt % to 40 wt %.

The multi-layer LCD element according to another aspect of the present invention is a multi-layer LCD element in which a plurality of liquid crystal layers, each of which is provided between a pair of substrates, are laminated on top of another, and at least one of the plurality of liquid crystal layers, and a pair of the substrates sandwiching the at least one liquid crystal layer, constitute the above-described LCD element.

The multi-layer LCD element utilizes a plurality of LCD elements that carry out display in different colors, respectively, thereby being capable of color display of not less than two colors. It should be noted that when at least three LCD elements carrying out blue color display, green color display, and red color display, respectively, are used, it is possible to obtain full-color display.

In any case, such a multi-layer LCD element is, for instance, a multi-layer LCD element in which a plurality of LCD elements including at least one (or possibly, all) of the LCD element according to the present invention are laminated on top of another. In this case, adjacent LCD elements may share one substrate therebetween.

In any case, at least one of the pair of substrates may be made of a resin material.

BRIEF DESCRIPTION OF DRAWINGS

These and other objects, advantages and features of the invention will become apparent from the following description thereof taken in conjunction with the accompanying drawings in which:

FIG. 8 is a table showing outcomes of experiments on Examples 1 to 9; and

FIG. 9 is a table showing outcomes of experiments on Comparative Examples 1 to 4.

PREFERRED EMBODIMENTS

Figure 1:
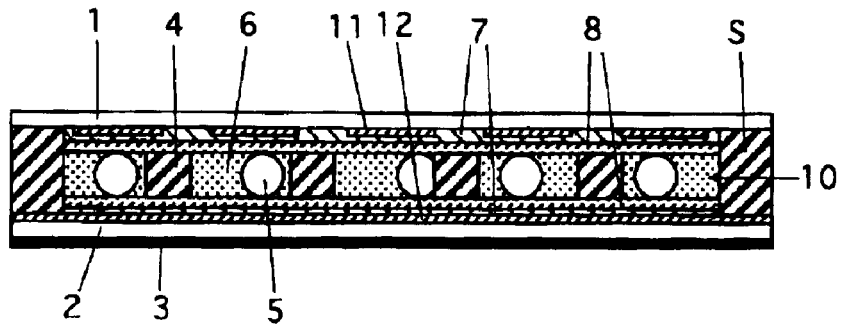
FIG. 1 is a schematic cross-sectional view of an example of an LCD element according to the present invention.

The following description will depict an embodiment of the present invention while referring to the drawings.

An LCD element according to the present invention may be configured, for instance, as described below.

Figure 2:
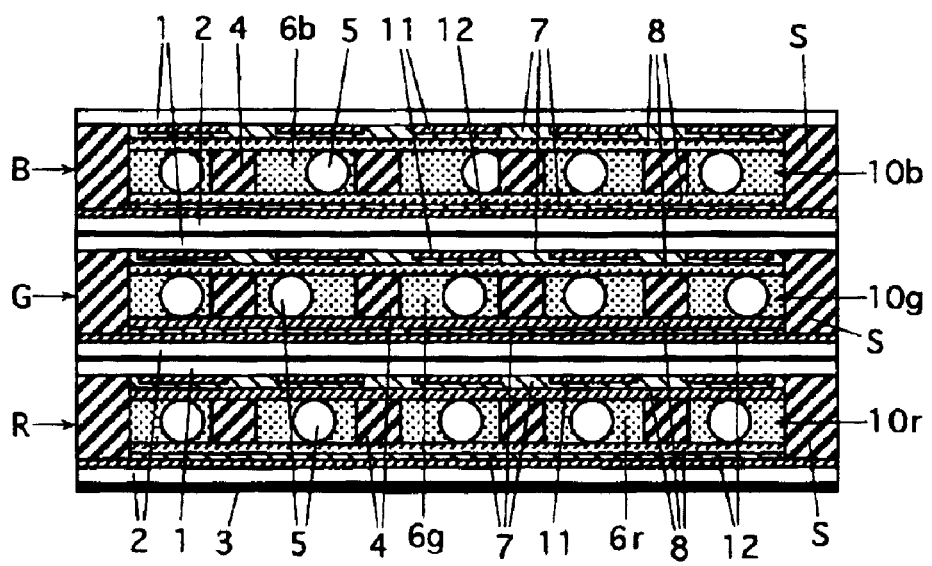
FIG. 2 is a schematic cross-sectional view of another example of an LCD element according to the present invention, which is a multi-layer LCD element in which an LCD element for blue display, an LCD element for green display, and an LCD element for red display are laminated in the stated order.

FIG. 1 is a schematic cross-sectional view of an LCD element according to the present invention. FIG. 2 shows an example of a multi-layer LCD element according to the present invention, in which three LCD elements, namely, an LCD element for blue display, an LCD element for green display, and an LCD element for red display, are laminated in the stated order. It should be noted that in the LCD elements shown in FIGS. 1 and 2, the members basically having the same configurations and functions are designated by the same referential codes.

The LCD element shown in FIG. 1 comprises a pair of substrates 1 and 2, and a liquid crystal layer 10 provided between the substrates 1 and 2. The liquid crystal layer 10 contains a liquid crystal composition 6 that exhibits a cholesteric phase at room temperature. Between the pair of the substrates 1 and 2, resin structures 4 and spacers 5 are provided as space maintaining members for maintaining a space between the substrates.

Besides, LCD elements B, G, and R constituting a multi-layer LCD element shown in FIG. 2 comprise pairs of substrates 1 and 2, and liquid crystal layers 10b, 10g, and 10r for blue display, green display, and red display provided between the pairs of substrates 1 and 2, respectively. The liquid crystal layers 10b, 10g, and 10r contain liquid crystal compositions 6b, 6g, and 6r that exhibit a cholesteric phase at room temperature, respectively. Between each of the pairs of substrates 1 and 2 having the liquid crystal layers 10b, 10g, and 10r therebetween, respectively, resin structures 4 and spacers 5 are provided as space maintaining members for maintaining a space between the substrates.

Not only in the cases of the LCD elements shown in FIGS. 1 and 2, but also in any LCD element according to the present invention, electrodes can be provided on the pair of substrates.

In each of the LCD elements shown in FIGS. 1 and 2, at least one of the substrates 1 and 2 is a substrate having transparency. Herein, both of the substrates 1 and 2 have transparency, and a plurality of parallel belt-like transparent electrodes 11 and 12 are provided on surfaces of the substrates 1 and 2, respectively. The electrodes 11 and the electrodes 12 are provided vis-à-vis, crossing with each other. It is preferable that the electrodes are coated with an insulating thin film. Here, the electrodes 11 and 12 are coated with insulating films 7, and further on each of the insulating films 7, an alignment stabilization film 8 is provided.

Furthermore, on an external surface (reverse surface) of the substrate that is opposite to the light-incident side, a visible light absorbing layer is provided as required. In the example shown in FIG. 1, the visible light absorbing layer 3 is provided on an external surface (reverse surface) of the substrate 2, while in the example shown in FIG. 2, the visible light absorbing layer 3 is provided on an external surface (reverse surface) of the substrate 2 of the LCD element R.

S denotes a sealing member, for sealing the liquid crystal compositions 6, 6b, 6g, or 6r between the pairs of substrates 1 and 2.

≦Substrates>

Both of the substrates 1 and 2 have transparency as described above, and such transparent substrates are typically glass substrates. Examples of transparent substrates, other than the glass substrates, include flexible substrates made of polycarbonate (PC), polyethersulfone (PES), polyarylate (PAr), polyethylene terephthalate (PET), or the like.

≦Electrodes>

To form the electrodes, transparent conductive films made of indium tin oxide (ITO), indium zinc oxide (IZO), or the like, metal films made of aluminum, silicon, or the like, photoconductive films made of amorphous silicon, bismuth silicon oxide (BSO), or the like may be used.

In the LCD elements shown in FIGS. 1 and 2, as described above, a plurality of parallel belt-like transparent electrodes 11 and 12 are provided on surfaces of the transparent substrates 1 and 2, respectively, and the electrodes 11 and 12 are provided vis-à-vis, so as to cross each other.

To form the electrodes in the foregoing manner, ITO films may be deposited with use of masks on the transparent substrate by sputtering or the like, or alternatively, an ITO film may be formed over an entirety of the surface and thereafter patterned by photolithography.

In the LCD elements of the present invention, including the LCD elements shown in FIGS. 1 and 2, insulating thin films may be provided, for instance, so as to prevent the electrodes from short-circuiting or to serve as gas barrier layers, for improving reliability of the LCD element. Besides, an alignment stabilization film may be provided on the substrate as required. As described above, herein, the electrodes 11 and 12 are coated with the insulating films 7, and the alignment stabilization film 8 is provided on the insulating film 7.

≦Insulating Thin Film>

Examples of films applicable as the insulating thin films include inorganic films made of inorganic materials such as silicon oxide, titanium oxide, zirconium oxide, alkoxides of any of these, or the like, and organic films made of organic materials such as polyimide resin, acrylic resin, urethane resin, or the like. The insulating thin film can be formed by a known method such as vapor deposition, spin coating, or roller coating, by using the foregoing material. Furthermore, in the case where a pigment is added to the foregoing material, the film functions as a color filter. Moreover, the insulating thin film can be formed with the same material as a polymer resin used for forming the resin structure.

≦Alignment Stabilization Film>

Examples of films adaptable as the alignment stabilization film include organic films made of organic materials such as polyimide resins, polyamide imide resins, polyether imide resins, polyvinyl butyral resins, acrylic resins, or the like, and inorganic films made of inorganic materials such as silicon oxides, aluminum oxides, or the like. An alignment stabilization film made of such a material need not be subjected to rubbing. Furthermore, an alignment stabilization film may be made to function as an insulating thin film also.

≦Spacers>

In the LCD elements of the present invention, including the LCD elements shown in FIGS. 1 and 2, spacers may be provided between each pair of substrates as space maintaining members for keeping a gap between the substrates uniform. The LCD elements shown in FIGS. 1 and 2 are provided with spacers 5 between the substrates 1 and 2, as described above.

Figure 3:
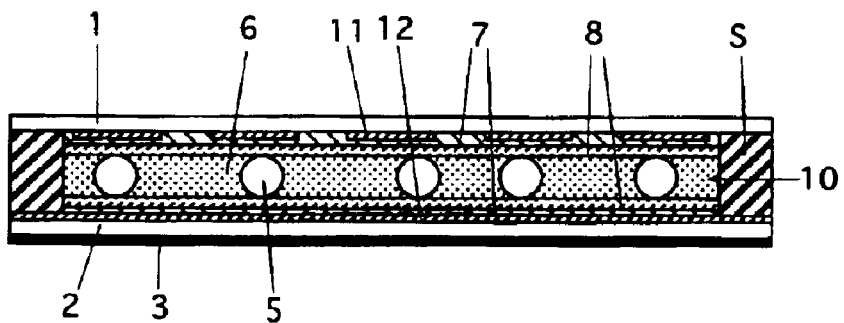
FIG. 3 is a view illustrating a state of the LCD element shown in FIG. 1 in which only spacers are used as space maintaining members.
Figure 4:
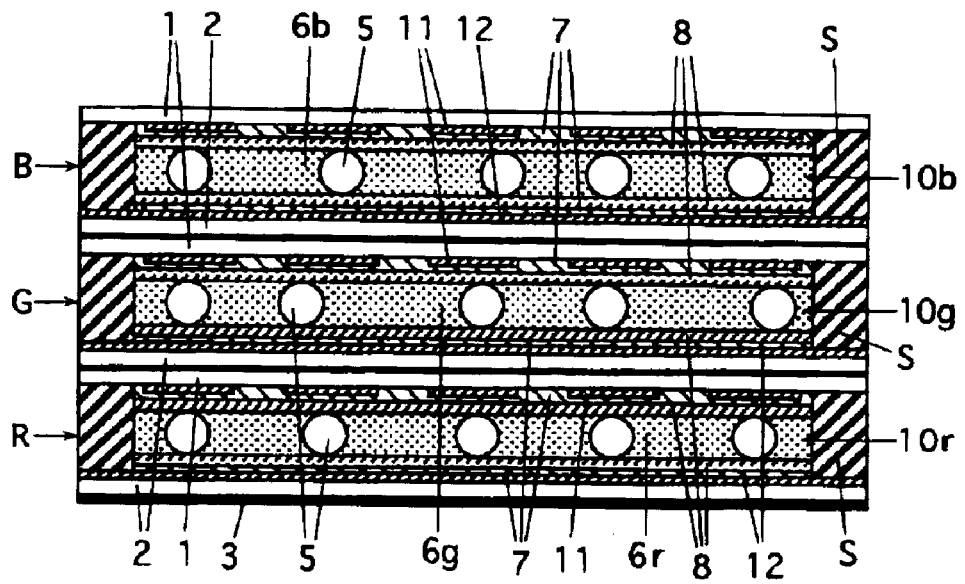
FIG. 4 is a view illustrating a state of the LCD element shown in FIG. 2 in which only spacers are used as space maintaining members.

As the foregoing spacers, spherical members made of a resin or an inorganic oxide may be used, for instance. Further, fixing spacers whose surfaces are coated with a thermoplastic resin are preferably applicable also. It should be noted that both the spacers and the resin structures may be provided as in the LCD elements shown in FIGS. 1 and 2, but only the spacers maybe provided as the space maintaining members, without the resin structures. Configurations in such a case are shown in FIGS. 3 and 4.

≦Liquid Crystal Composition>

Any one of the liquid crystal compositions 6, 6b, 6g, and 6r contained in the liquid crystal layer contains a mixture of a chiral material and nematic liquid crystal. As nematic liquid crystal, nematic liquid crystal applied to a common twisted nematic (TN) type and a super twisted nematic (STN) type is applicable. Those which is in the nematic state at a temperature ranging from −30° C. to 100° C., or preferably, −40° C. to 110° C., are applicable. Furthermore, chiral nematic liquid crystal having a refractive index anisotropy Δn ranging from 0.15 to 0.23 and a dielectric anisotropy Δ∈ ranging from 5 to 50, containing 7 wt % to 40 wt % of a chiral material, is preferably used as the liquid crystal composition. It should be noted that the foregoing content of the added chiral material is a proportion with respect to a total amount of the nematic liquid crystal and the chiral material.

Further, viscosities of the liquid crystal compositions 6, 6b, 6g, and 6r are given as a, ab, ag, and ar [cP (centi-poise)], respectively, dielectric anisotropies Δ∈ of the liquid crystal compositions 6, 6b, 6g, and 6r are given as b, bb, bg, and br, respectively, and thicknesses of the liquid crystal layers 10, 10b, 10g, and 10r are given as c, cb, cg, and cr [μm]. Each of the viscosities a, ab, ag, and ar ranges from 30 [cP] to 150 [cP], each of the dielectric anisotropies (Δ∈) b, bb, bg, and br ranges from 5 to 50. Each of the thicknesses c, cb, cg, and cr [μm] ranges from 3 [μm] to 8 [μm]. Then, each of a product of the foregoing a, b, and C, a product of the foregoing ab, bb, and cb, a product of the foregoing ag, bg, and cg, and a product of the foregoing ar, br, and cr is not less than 3500 and not more than 35000. In the case where the product is more than 35000, the driving voltage rises, thereby causing the speed of response to decrease. On the contrary, in the case where the product is less than 3500, problems such as an insufficient contrast or an excessively high driving voltage arise.

≦Resin Structure>

Figure 6:
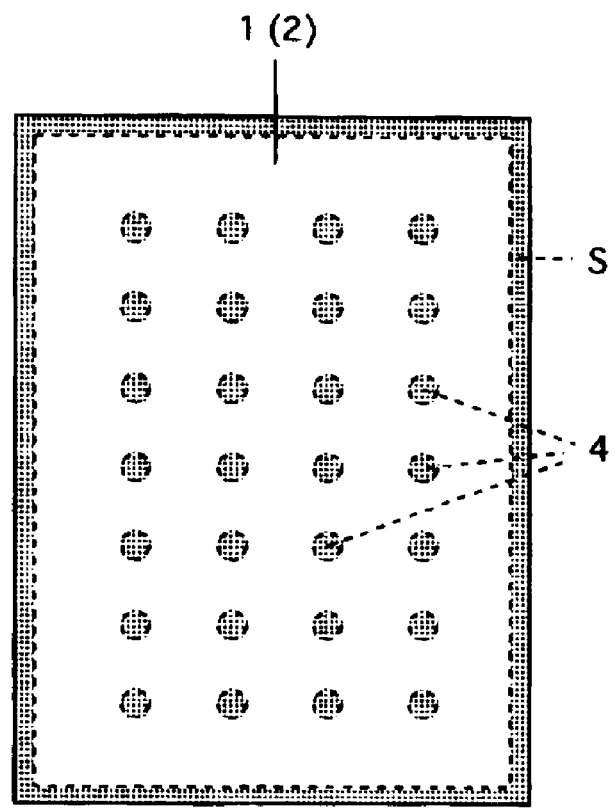
FIG. 6 is a view illustrating an example of arrangement of resin structures provided in an LCD element according to the present invention.

In the LCD element of the present invention, such as the LCD elements shown in FIGS. 1 and 2, structures as space maintaining members may be provided between a pair of substrates so as to support the substrates so that a strong self-holding property is rendered. In the LCD elements shown in FIGS. 1 and 2, resin structures 4 are provided between the substrates 1 and 2. An example of an arrangement of resin structures 4 is shown in FIG. 6.

Regarding the resin structures, the configuration of the resin structure is explained first. Examples of the resin structures include pillar (e.g., columnar or prismatic) structures, such as cylindrical structures, quadratic-prism structures, elliptic-cylinder structures, trapezoidal-prism structures, or conic structures arranged in a predetermined pattern such as matrix with certain spaces therebetween (see FIG. 6). Besides, they may be arranged in stripes with predetermined spaces therebetween. These columnar/prismatic structures are preferably arranged, not at random, but in a manner such that the space between the substrates is appropriately maintained, and the columnar/prismatic structures should not affect image display. For instance, the columnar/prismatic structures may be arranged at uniform spaces, the space between adjacent structures may gradually vary, or a predetermined arrangement pattern is repeated at a predetermined cycle. In the case where the columnar/prismatic structures occupy an area of 1% to 40% of the display region of the LCD element, the LCD element thus configured is capable of maintaining appropriate strength, while obtaining practically satisfactory characteristics as the LCD element.

As the material for the columnar/prismatic structures, various resin materials are adaptable, for instance, thermoplastic resin materials, thermosetting resin materials, and photo-curing resin materials.

The columnar/prismatic structures may be formed through a process in which a resin material is directly disposed by screen printing or the like, or a process in which a resin material is applied throughout the surface and thereafter patterned by photolithography with use of a mask.

To form an LCD element, a liquid crystal composition may be injected into between substrates that have columnar/prismatic structures therebetween by a method such as vacuum injection. Alternatively, before substrates are assembled, a liquid crystal composition may be dripped over a substrate, so that the liquid crystal composition is sealed at the same time when the substrates are assembled.

Furthermore, to improve the accuracy of gap control between substrates, when columnar/prismatic structures are formed, spacer materials in sizes smaller than the height of the columnar/prismatic structures, for instance, glass fibers, ball-shaped glass or ceramic powders, or spherical particles made of an organic material, may be provided so that the gap does not vary due to heat or pressure applied thereto. By so doing, the gap accuracy is further improved, thereby making it possible to suppress voltage irregularities, display irregularities, etc.

≦Sealing Member>

Adaptable as a material for a sealing member are materials adaptable for forming the aforementioned resin structures, for instance, photo-curing resin materials, thermoplastic resin materials, and thermosetting resin materials. The sealing member may be formed by any one of various conventional known methods, including the dispenser method or the ink jet method in which a resin is jetted from a tip of a nozzle onto a peripheral part of a substrate, the printing method utilizing a screen plate or a metal mask, and the transfer method in which a resin is disposed on a flat substrate or a roller and thereafter it is transferred to the substrate.

Figure 5:
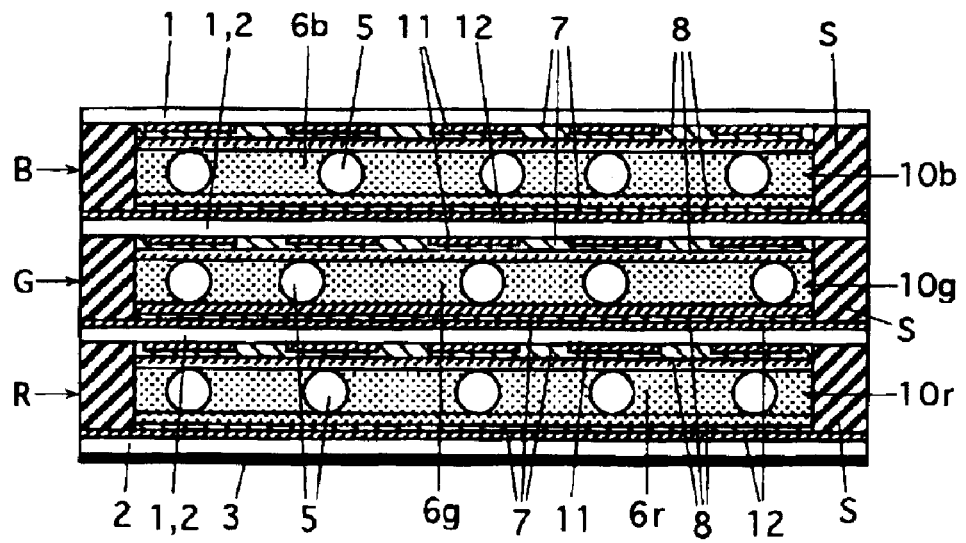
FIG. 5 is a view illustrating a state of the multi-layer LCD element shown in FIG. 4 in which adjacent LCD elements share one substrate therebetween.

In the multi-layer LCD element of the present invention, such as the LCD elements shown in FIGS. 2 and 4, LCD elements adjacent to each other may share one substrate therebetween. FIG. 5 shows a modification of the multi-layer LCD element shown in FIG. 4, which is modified so that adjacent LCD elements B and G, and adjacent LCD elements G and R share the substrates 1 and 2 that are disposed therebetween, respectively.

In the LCD elements shown in FIGS. 1 and 3, display is carried out by applying a predetermined voltage so as to cause a state of the liquid crystal 6 to switch between a planer state (colored state) and a focal conic state (transparent state, black display state) in response to the voltage.

Furthermore, in the multi-layer LCD elements shown in FIGS. 2, 4, and 5, display is carried out by applying a predetermined voltage so as to cause states of the liquid crystal compositions 6r, 6g, and 6b to switch between a planer state (colored state) and a focal conic state (transparent state) in response to the voltage. It should be noted that in the LCD element shown in FIG. 2, white display is obtained when the liquid crystal compositions 6b, 6g, and 6r are all rendered in the colored state, while black display is obtained when they are all rendered in a discolored state.

According to the LCD elements so far explained, the liquid crystal compositions 6, 6b, 6g, and 6r are chiral nematic liquid crystal compositions containing mixtures of chiral materials and nematic liquid crystal, respectively. The viscosities of a, ab, ag, and ar of the liquid crystal compositions 6, 6b, 6g, and 6r are all in a range of 30 [cP] to 150 [cP]. The dielectric anisotropies (Δ∈) b, bb, bg, and br of the liquid crystal composition 6, 6b, 6g, and 6r are all in a range of 5 to 50. The thicknesses c, cb, cg, and cr of the liquid crystal layers are all in a range of 3 [μm] to 8 [μm]. The product of a, b, and c, the product of ab, bb, and cb, the product of ag, bg, and cg, and the product of ar, br, and cr are all in a range of 3500 to 35000. Therefore, the LCD elements can be driven with a low voltage, and is capable of obtaining a great light reflectance and a high contrast.

Performance evaluation tests of the LCD elements configured as described above were carried out, and are described below, along with comparative tests. It should be noted that the present invention is not limited to these examples.

In the performance evaluation tests, LCD elements were produced, and a driving voltage (reflectance-maximizing voltage) when a substantially maximum reflectance was obtained in the planer state (colored state) was determined. Then, a contrast was determined by calculating (substantially maximum reflectance in the planer state)/ (reflectance when liquid crystal exhibits the focal conic state (transparent state)).

Furthermore, in comparative experiments, several types of LCD elements that differ in the distance between electrodes (i.e., the thickness of the liquid crystal layer) were prepared as LCD elements for comparative experiments. Among them, an LCD element that exhibited a planer state (colored state) when the driving voltage was 40 V was selected, and a contrast thereof was determined by calculating (reflectance when the driving voltage is 40 V)/ (reflectance when liquid crystal exhibits the focal conic state (transparent state)). Further, as to the same LCD element, a driving voltage (reflectance-maximizing voltage) when a substantially maximum reflectance was obtained in the planer state was determined.

In each experimental example, the measurement of a reflectance was carried out by measuring a luminous reflectance (Y value) with a reflective spectrophotometer CM-3700d (produced by Minolta Co., Ltd.). A smaller Y value indicates more transparency.

Furthermore, measurement of viscosities of the liquid crystal compositions, calculation of dielectric anisotropies Δ∈ of the liquid crystal compositions, application of driving voltages, and measurement of reflectance-maximizing driving voltages were carried out in the manners described below.

* Viscosity of Liquid Crystal Composition

Viscosities [cP] were values when a shear rate Gp was 100 [1/s], which were measured with RS-50 produced by Haake GmbH, Germany.

* Calculation of Dielectric Anisotropy Δ∈ of Liquid Crystal Composition

Dielectric anisotropies Δ∈ of the liquid crystal compositions were calculated by the equation below:

$$\Delta\in = (C\perp/C\perp_0) - (C\|/C\|_0)$$

where:

$C\perp_0$ represents a charge capacity of a glass cell with a 10 μm cell gap on which a perpendicular alignment film is laminated, when the cell is vacant;

$C\perp$ represents a charge capacity of a glass cell with a 10 μm cell gap on which a perpendicular alignment film is laminated, when the cell is filled with liquid crystal;

$C\|_0$ represents a charge capacity of a glass cell with a 10 μm cell gap on which a parallel alignment film is laminated, when the cell is vacant; and $C\|$ represents a charge capacity of a glass cell with a 10 μm cell gap on which a parallel alignment film is laminated, when the cell is filled with liquid crystal.

*Application of Driving Voltage

Measurement of a driving voltage was carried out by using a pulse with a pulse width of 5 msec. More specifically, two cycles of a predetermined pulse voltage with a voltage pulse width of 5 msec and a 0 V width of 5 msec were applied to each liquid crystal element, and this driving action was repeated twice, so as to drive the liquid crystal element.

*Measurement of Reflectance-Maximizing Voltage

In the foregoing driving voltage application, after every measurement, the liquid crystal composition was returned from the planer state (colored state) to the focal conic state (transparent state). Here, the voltage applied for returning the liquid crystal composition to the focal conic state was rendered constant, while the voltage applied for shifting the liquid crystal composition to the planer state was raised at a rate of 1V, and a voltage that maximized the reflectance in the planer state was determined. This voltage was determined to as a reflectance-maximizing voltage.

EXAMPLE 1

10.2 percent by weight (wt %) of a nester-based chiral material i (helical twist power (HTP):8.1, this also applies to the chiral material i used in examples described below) and 6.5 wt % of a cyanobiphenyl-based chiral material ii (HTP:12.7, this also applies to the chiral material ii used in the examples described below) were mixed in a nematic liquid crystal mixture composition P containing a liquid crystalline ester compound as a main component ($T_{N-I}$ (phase transition temperature from the nematic phase to the isotropic phase):99.2° C.), and its selective reflection wavelength was adjusted to 480 nm, so that a chiral nematic liquid crystal composition A was prepared. It should be noted that the helical twist power (HTP) is indicative of a selective reflection wavelength of a liquid crystal composition obtained by adding 1 wt % of a chiral material to nematic liquid crystal. This also applies to the examples described below.

Physical properties of the foregoing liquid crystal composition A were measured, and the viscosity and the dielectric anisotropy Δ∈ of the same were determined to be 100 cP and 23.7, respectively.

Figure 7:
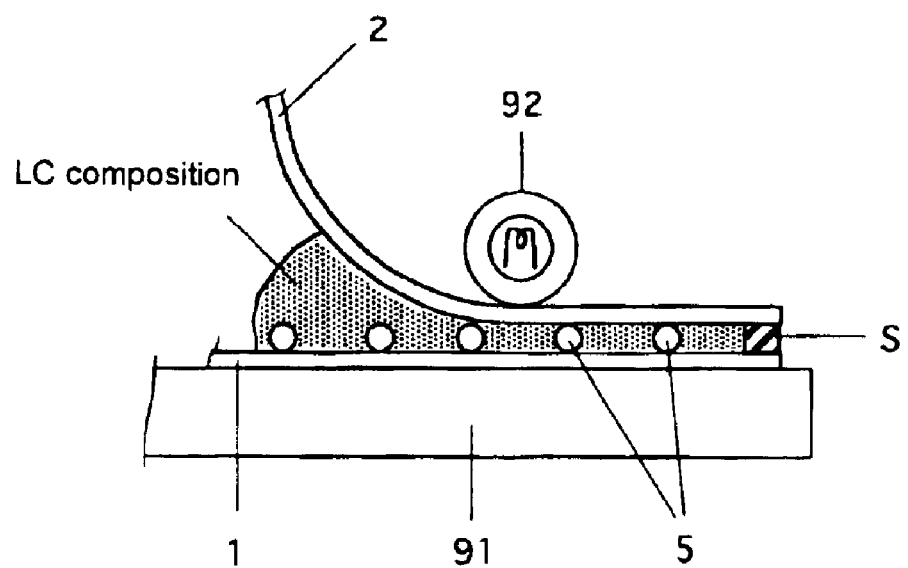
FIG. 7 is a view illustrating an example of an assembling device for assembling a pair of substrates for producing an LCD element according to the present invention.

A sealing member for sealing a liquid crystal composition was provided at a peripheral part of one of a pair of polycarbonate substrates on each of which electrodes were provided, and the pair of substrates were assembled so that the electrode-provided surfaces of the substrates face each other, with a liquid crystal composition being interposed therebetween. Then, the pair of substrates were pressurized while heated. The pressurizing and heating process was carried out, for instance, by using an assembling device shown in FIG. 7. One of the substrates (1 in the drawing) was placed on a flat plate (91 in the drawing) of the device, and the other substrate (2 in the drawing) was placed on top of the above substrate. The substrates were heated and pressurized by a heating-pressurizing roller (92 in the drawing) entirely from an end thereof, by relatively passing the substrates through between the roller 92 and the flat plate 91. It should be noted that S and 5 in FIG. 7 denote a sealing wall and spacers, respectively. Thus, two substrates were assembled and adjusted so that a liquid crystal layer to be provided therebetween would have a thickness of 6 μm, and the aforementioned liquid crystal composition A was provided therebetween. Furthermore, a black light absorbing layer was provided on an external surface (reverse surface) of one of the substrates. An LCD element was thus produced.

When a pulse voltage of 20 V was applied for 5 msec across electrodes sandwiching the liquid crystal layer of the LCD element, the liquid crystal layer exhibited the focal conic state (transparent state), and the Y value was 1.56. Furthermore, when a pulse voltage of 35 V was applied for 5 msec, the liquid crystal layer exhibited a maximum reflectance in the planer state (blue state), and the Y value was 7.49. The contrast was 4.80.

EXAMPLE 2

5.5 wt % of the chiral material i, 14.9 wt % of the chiral material ii, and 3.3 wt % of an ester-based chiral material iii (HTP:32.6, this also applies to the chiral material iii used in examples described below) were mixed in a nematic liquid crystal mixture composition Q containing a liquid crystalline tolan compound as a main component ($T_{N-I}$: 116.7° C., this also applies to the nematic liquid crystal mixture composition Q used in examples described below), and its selective reflection wavelength was adjusted to 480 nm, so that a chiral nematic liquid crystal composition B was prepared.

Physical properties of the foregoing liquid crystal composition B were measured, and the viscosity and the dielectric anisotropy $\Delta\in$ of the same were determined to be 135 cP and 16.4, respectively.

A sealing member for sealing a liquid crystal composition was provided at a peripheral part of one of a pair of polycarbonate substrates on each of which electrodes were provided, while a liquid crystal injection hole was secured. Then, the pair of substrates were faced with each other, and spacers were provided between the substrates. The substrates were adjusted so that a liquid crystal layer to be provided therebetween would have a thickness of 3 μm, and the aforementioned liquid crystal composition B was injected therein through the liquid crystal injection hole. Furthermore, a black light absorbing layer was provided on an external surface (reverse surface) of one of the substrates. An LCD element was thus produced.

When a pulse voltage of 25 V was applied for 5 msec across electrodes sandwiching the liquid crystal layer of the LCD element, the liquid crystal layer exhibited the focal conic state (transparent state), and the Y value was 1.53. Furthermore, when a pulse voltage of 36 V was applied for 5 msec, the liquid crystal layer exhibited a maximum reflectance in the planer state (blue state), and the Y value was 8.08. The contrast was 5.28.

EXAMPLE 3

4.5 wt % of the chiral material i and 19.9 wt % of the chiral material ii were mixed in the nematic liquid crystal mixture composition Q, and its selective reflection wavelength was adjusted to 555 nm, so that a chiral nematic liquid crystal composition C was prepared.

Physical properties of the foregoing liquid crystal composition C were measured, and the viscosity and the dielectric anisotropy $\Delta\in$ of the same were determined to be 100 cP and 15.9, respectively.

A sealing member for sealing a liquid crystal composition was provided at a peripheral part of one of a pair of polycarbonate substrates on each of which electrodes were provided. Then, the pair of substrates were faced with each other. As in Example 1, spacers were provided between the substrates, and the substrates were adjusted so that a liquid crystal layer to be provided therebetween would have a thickness of 5 μm, and then, the aforementioned liquid crystal composition C was interposed between the substrates. Furthermore, a black light absorbing layer was provided on an external surface (reverse surface) of one of the substrates. An LCD element was thus produced.

When a pulse voltage of 24 V was applied for 5 msec across electrodes sandwiching the liquid crystal layer of the LCD element, the liquid crystal layer exhibited the focal conic state (transparent state), and the Y value was 1.68. Furthermore, when a pulse voltage of 38 V was applied for 5 msec, the liquid crystal layer exhibited a maximum reflectance in the planer state (green state), and the Y value was 16.53. The contrast was 9.84.

EXAMPLE 4

3.3 wt % of the chiral material i and 17.4 wt % of anester-based chiral material iv (HTP:17.5, this also applies to the chiral material iv used in examples described below) were mixed in the nematic liquid crystal mixture composition Q, and its selective reflection wavelength was adjusted to 550 nm, so that a chiral nematic liquid crystal composition D was prepared.

Physical properties of the foregoing liquid crystal composition D were measured, and the viscosity and the dielectric anisotropy $\Delta\in$ of the same were determined to be 100 cP and 17.2, respectively.

A sealing member for sealing a liquid crystal composition was provided at a peripheral part of one of a pair of polycarbonate substrates on each of which electrodes were provided. Then, the pair of substrates were faced with each other. As in Example 1, spacers were provided between the substrates, and the substrates were adjusted so that a liquid crystal layer to be provided therebetween would have a thickness of 5 μm, and then, the aforementioned liquid crystal composition D was interposed between the substrates. Furthermore, a black light absorbing layer was provided on an external surface (reverse surface) of one of the substrates. An LCD element was thus produced.

When a pulse voltage of 25 V was applied for 5 msec across electrodes sandwiching the liquid crystal layer of the LCD element, the liquid crystal layer exhibited the focal conic state (transparent state), and the Y value was 1.76. Furthermore, when a pulse voltage of 39 V was applied for 5 msec, the liquid crystal layer exhibited a maximum reflectance in the planer state (green state), and the Y value was 20.48. The contrast was 11.64.

EXAMPLE 5

13.5 wt % of a cholesteric chiral material v (HTP: 22.8) was mixed in a nematic liquid crystal mixture composition R containing a liquid crystalline tolan compound as a main component ($T_{N\text{-}I}$: 101.6° C.) and its selective reflection wavelength was adjusted to 675 nm, so that a chiral nematic liquid crystal composition E was prepared.

Physical properties of the foregoing liquid crystal composition E were measured, and the viscosity and the dielectric anisotropy $\Delta\in$ of the same were determined to be 58 cP and 18.3, respectively.

A sealing member for sealing a liquid crystal composition was provided at a peripheral part of one of a pair of polycarbonate substrates on each of which electrodes were provided. Then, the pair of substrates were faced with each other. As in Example 1, spacers were provided between the substrates, and the substrates were adjusted so that a liquid crystal layer to be provided therebetween would have a thickness of 4 μm, and then, the aforementioned liquid crystal composition E was interposed between the substrates. Furthermore, a black light absorbing layer was provided on an external surface (reverse surface) of one of the substrates. An LCD element was thus produced.

When a pulse voltage of 20 V was applied for 5 msec across electrodes sandwiching the liquid crystal layer of the LCD element, the liquid crystal layer exhibited the focal conic state (transparent state), and the Y value was 1.54. Furthermore, when a pulse voltage of 36 V was applied for 5 msec, the liquid crystal layer exhibited a maximum reflectance in the planer state (red state), and the Y value was 6.50. The contrast was 4.22.

EXAMPLE 6

2.9 wt % of the chiral material i and 10.4 wt % of the chiral material iii were mixed in the nematic liquid crystal mixture composition Q, and its selective reflection wavelength was adjusted to 680 nm, so that a chiral nematic liquid crystal composition F was prepared.

Physical properties of the foregoing liquid crystal composition F were measured, and the viscosity and the dielectric anisotropy $\Delta\in$ of the same were determined to be 85 cP and 17.1, respectively.

A sealing member for sealing a liquid crystal composition was provided at a peripheral part of one of a pair of polycarbonate substrates on each of which electrodes were provided. Then, the pair of substrates were faced with each other. As in Example 1, spacers were provided between the substrates, and the substrates were adjusted so that a liquid crystal layer to be provided therebetween would have a thickness of 5 μm, and then, the aforementioned liquid crystal composition F was interposed between the substrates. Furthermore, a black light absorbing layer was provided on an external surface (reverse surface) of one of the substrates. An LCD element was thus produced.

When a pulse voltage of 24 V was applied for 5 msec across electrodes sandwiching the liquid crystal layer of the LCD element, the liquid crystal layer exhibited the focal conic state (transparent state), and the Y value was 1.90. Furthermore, when a pulse voltage of 40 V was applied for 5 msec, the liquid crystal layer exhibited a maximum reflectance in the planer state (red state), and the Y value was 7.32. The contrast was 3.85.

EXAMPLE 7

6.0 wt % of the chiral material iii and 4.4 wt % of the chiral material iv were mixed in a nematic liquid crystal mixture composition S containing a liquid crystalline ester compound as a main component ($T_{N\text{-}I}$: 94.7° C.), and its selective reflection wavelength was adjusted to 550 nm, so that a chiral nematic liquid crystal composition G was prepared.

Physical properties of the foregoing liquid crystal composition G were measured, and the viscosity and the dielectric anisotropy $\Delta\in$ of the same were determined to be 50 cP and 19.9, respectively.

A sealing member for sealing a liquid crystal composition was provided at a peripheral part of one of a pair of polycarbonate substrates on each of which electrodes were provided. Then, the pair of substrates were faced with each other. As in Example 1, spacers were provided between the substrates, and the substrates were adjusted so that a liquid crystal layer to be provided therebetween would have a thickness of 4 μm, and then, the aforementioned liquid crystal composition G was interposed between the substrates. Furthermore, a black light absorbing layer was provided on an external surface (reverse surface) of one of the substrates. An LCD element was thus produced.

When a pulse voltage of 28 V was applied for 5 msec across electrodes sandwiching the liquid crystal layer of the LCD element, the liquid crystal layer exhibited the focal conic state (transparent state), and the Y value was 1.72. Furthermore, when a pulse voltage of 39 V was applied for 5 msec, the liquid crystal layer exhibited a maximum reflectance in the planer state (green state), and the Y value was 19.31. The contrast was 11.23.

EXAMPLE 8

9.5 wt % of the tricyclic-based chiral material vi (HTP:13.5, this also applies to the chiral material vi used in examples described below) and 11.4 wt % of an ester-based chiral material vii (HTP: 9.8) were mixed in a nematic liquid crystal mixture composition T containing a liquid crystalline tolan compound as a main component ($T_{N\text{-}I}$: 109.3° C.), and its selective reflection wavelength was adjusted to 480 nm, so that a chiral nematic liquid crystal composition H was prepared.

Physical properties of the foregoing liquid crystal composition H were measured, and the viscosity and the dielectric anisotropy $\Delta\in$ of the same were determined to be 37 cP and 35.2, respectively.

A sealing member for sealing a liquid crystal composition was provided at a peripheral part of one of a pair of polyethersulfone substrates on each of which electrodes were provided. Then, the pair of substrates were faced with each other. As in Example 1, spacers were provided between the substrates, and the substrates were adjusted so that a liquid crystal layer to be provided therebetween would have a thickness of 8 μm, and then, the aforementioned liquid crystal composition H was interposed between the substrates. Furthermore, a black light absorbing layer was provided on an external surface (reverse surface) of one of the substrates. An LCD element was thus produced.

When a pulse voltage of 31 V was applied for 5 msec across electrodes sandwiching the liquid crystal layer of the LCD element, the liquid crystal layer exhibited the focal conic state (transparent state), and the Y value was 1.54. Furthermore, when a pulse voltage of 40 V was applied for 5 msec, the liquid crystal layer exhibited a maximum reflectance in the planer state (blue state), and the Y value was 7.49. The contrast was 4.86.

EXAMPLE 9

7.4 wt % of the chiral material i and 14.1 wt % of the chiral material vi were mixed in a nematic liquid crystal mixture composition U containing a liquid crystalline ester compound as a main component ($T_{N\text{-}I}$: 98.8° C.), and its selective reflection wavelength was adjusted to 660 nm, so that a chiral nematic liquid crystal composition I was prepared.

Physical properties of the foregoing liquid crystal composition I were measured, and the viscosity and the dielectric anisotropy $\Delta \in$ of the same were determined to be 142 cP and 28.9, respectively.

A sealing member for sealing a liquid crystal composition was provided at a peripheral part of one of a pair of polyethersulfone substrates on each of which electrodes were provided. Then, the pair of substrates were faced with each other. As in Example 1, spacers were provided between the substrates, and the substrates were adjusted so that a liquid crystal layer to be provided therebetween would have a thickness of 8 $\mu$m, and then, the aforementioned liquid crystal composition I was interposed between the substrates. Furthermore, a black light absorbing layer was provided on an external surface (reverse surface) of one of the substrates. An LCD element was thus produced.

When a pulse voltage of 30 V was applied for 5 msec across electrodes sandwiching the liquid crystal layer of the LCD element, the liquid crystal layer exhibited the focal conic state (transparent state), and the Y value was 1.94. Furthermore, when a pulse voltage of 40 V was applied for 5 msec, the liquid crystal layer exhibited a maximum reflectance in the planer state (red state), and the Y value was 6.26. The contrast was 3.23.

COMPARATIVE EXAMPLE 1

16.3 wt % of the chiral material i and 11.9 wt % of the chiral material ii were mixed in a nematic liquid crystal mixture composition V containing a liquid crystalline ester compound as a main component ($T_{N-I}$: 110.4° C.), and its selective reflection wavelength was adjusted to 480 nm, so that a chiral nematic liquid crystal composition J was prepared.

Physical properties of the foregoing liquid crystal composition J were measured, and the viscosity and the dielectric anisotropy $\Delta \in$ of the same were determined to be 43 cP and 6.85, respectively.

A sealing member for sealing a liquid crystal composition was provided at a peripheral part of one of a pair of polycarbonate substrates on each of which electrodes were provided. Then, the pair of substrates were faced with each other. As in Example 1, spacers were provided between the substrates, and the aforementioned liquid crystal composition J was interposed between the substrates. Furthermore, a black light absorbing layer was provided on an external surface (reverse surface) of one of the substrates. Several LCD elements of this type were prepared by using spacers with different particle diameters so that they had different distances between electrodes (different liquid crystal layer thicknesses), respectively.

When a pulse voltage of 40 V was applied for 5 msec across electrodes sandwiching the liquid crystal layer of a certain one of the LCD elements, the liquid crystal layer exhibited the planer state (blue state). The liquid crystal layer of this LCD element had a thickness of 5 $\mu$m, and the Y value was 4.48. Furthermore, when a pulse voltage of 24 V was applied for 5 msec, the liquid crystal layer exhibited the focal conic state (transparent state), and Y value was 1.39. The contrast was 3.22. When the liquid crystal layer exhibited a maximum reflectance in the planer state, the applied voltage was 60 V.

COMPARATIVE EXAMPLE 2

18.1 wt % of the chiral material i and 9.0 wt % of the chiral material ii were mixed in a nematic liquid crystal mixture composition W containing a liquid crystalline pyrimidine compound as a main component ($T_{N-I}$: 124.7° C.), and its selective reflection wavelength was adjusted to 550 nm, so that a chiral nematic liquid crystal composition K was prepared.

Physical properties of the foregoing liquid crystal composition K were measured, and the viscosity and the dielectric anisotropy $\Delta \in$ of the same were determined to be 64 cP and 6.67, respectively.

A sealing member for sealing a liquid crystal composition was provided at a peripheral part of one of a pair of polycarbonate substrates on each of which electrodes were provided. Then, the pair of substrates were faced with each other. As in Example 1, spacers were provided between the substrates, and the aforementioned liquid crystal composition K was interposed between the substrates. Furthermore, a black light absorbing layer was provided on an external surface (reverse surface) of one of the substrates. Several LCD elements of this type were prepared by using spacers with different particle diameters so that they had different distances between electrodes (different liquid crystal layer thicknesses), respectively.

When a pulse voltage of 40 V was applied for 5 msec across electrodes sandwiching the liquid crystal layer of a certain one of the LCD elements, the liquid crystal layer exhibited the planer state (green state). The liquid crystal layer of this LCD element had a thickness of 4.5 $\mu$m, and the Y value was 10.51. Furthermore, when a pulse voltage of 28 V was applied for 5 msec, the liquid crystal layer exhibited the focal conic state (transparent state), and Y value was 1.39. The contrast was 7.56. When the liquid crystal layer exhibited a maximum reflectance in the planer state, the applied voltage was 60 V.

COMPARATIVE EXAMPLE 3

13.5 wt % of the chiral material i and 11.9 wt % of the chiral material ii were mixed in a nematic liquid crystal mixture composition X containing a liquid crystalline pyrimidine compound as a main component ($T_{N-I}$: 120.2° C.), and its selective reflection wavelength was adjusted to 690 nm, so that a chiral nematic liquid crystal composition L was prepared.

Physical properties of the foregoing liquid crystal composition L were measured, and the viscosity and the dielectric anisotropy $\Delta \in$ of the same were determined to be 53 cP and 6.83, respectively.

A sealing member for sealing a liquid crystal composition was provided at a peripheral part of one of a pair of polycarbonate substrates on each of which electrodes were provided. Then, the pair of substrates were faced with each other. As in Example 1, spacers were provided between the substrates, and the aforementioned liquid crystal composition L was interposed between the substrates. Furthermore, a black light absorbing layer was provided on an external surface (reverse surface) of one of the substrates. Several LCD elements of this type were prepared by using spacers with different particle diameters so that they had different distances between electrodes (different liquid crystal layer thicknesses), respectively.

When a pulse voltage of 40 V was applied for 5 msec across electrodes sandwiching the liquid crystal layer of a certain one of the LCD elements, the liquid crystal layer exhibited the planer state (red state). The liquid crystal layer of this LCD element had a thickness of 4 $\mu$m, and the Y value was 3.53. Furthermore, when a pulse voltage of 30 V was applied for 5 msec, the liquid crystal layer exhibited the focal conic state (transparent state), and Y value was 1.72. The contrast was 2.05. When the liquid crystal layer exhibited a maximum reflectance in the planer state, the applied voltage was 100 V.

COMPARATIVE EXAMPLE 4

10.5 wt % of the chiral material i and 12.9 wt % of the chiral material ii were mixed in a nematic liquid crystal mixture composition Y containing a liquid crystalline ester compound as a main component ($T_{N-I}$: 89.3° C.), and its selective reflection wavelength was adjusted to 480 nm, so that a chiral nematic liquid crystal composition M was prepared.

Physical properties of the foregoing liquid crystal composition M were measured, and the viscosity and the dielectric anisotropy $\Delta \in$ of the same were determined to be 65 cP and 11.5, respectively.

A sealing member for sealing a liquid crystal composition was provided at a peripheral part of one of a pair of polycarbonate substrates on each of which electrodes were provided. Then, the pair of substrates were faced with each other. As in Example 1, spacers were provided between the substrates, and the aforementioned liquid crystal composition M was interposed between the substrates. Furthermore, a black light absorbing layer was provided on an external surface (reverse surface) of one of the substrates. Several LCD elements of this type were prepared by using spacers with different particle diameters so that they had different distances between electrodes (different liquid crystal layer thicknesses), respectively.

When a pulse voltage of 40 V was applied for 5 msec across electrodes sandwiching the liquid crystal layer of a certain one of the LCD elements, the liquid crystal layer exhibited the planer state (blue state). The liquid crystal layer of this LCD element had a thickness of 4.5 µm, and the Y value was 4.51. Furthermore, when a pulse voltage of 25 V was applied for 5 msec, the liquid crystal layer exhibited the focal conic state (transparent state), and Y value was 1.57. The contrast was 2.87. When the liquid crystal layer exhibited a maximum reflectance in the planer state, the applied voltage was 55 V.

Outcomes of these experiments are shown in FIGS. 8 and 9.

As obvious from the table shown in FIG. 8, in all the cases of the LCD elements of Examples 1 through 9, the reflectance-maximizing driving voltages that provided the maximum reflectances were not more than 40 V. On the other hand, as obvious from the table shown in FIG. 9, in the cases of the LCD elements of Comparative Examples 1 through 4, the reflectance-maximizing driving voltages were in a range of 55 V to 100 V.

As to the contrast, the LCD elements of Examples 1, 2, and 8 for blue display exhibited contrasts of 4.80 to 5.28. On the other hand, the LCD elements of Comparative Examples 1 and 4 exhibited contrasts of 2.87 to 3.22.

Furthermore, the LCD elements of Examples 3, 4, and 7 for green display exhibited contrasts of 9.84 to 11.64. On the other hand, the LCD element of Comparative Example 2 for green display exhibited a contrast of 7.56.

Furthermore, the LCD elements of Examples 5, 6, and 9 exhibited contrasts of 3.23 to 4.22. On the other hand, the LCD element of Comparative Example 3 for red display exhibited a contrast of 2.05.

Any one of the LCD elements of Examples exhibited a higher contrast than those of the corresponding LCD elements of Comparative Examples.

As has been described above, any one of the LCD elements according to the foregoing Examples can be driven with a low driving voltage and is capable of obtaining a great light reflectance and a high contrast.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A liquid crystal display element comprising a pair of substrates, a liquid crystal layer being provided between the substrates, and a visible light absorbing layer on a reverse surface of one of the substrates, the liquid crystal layer containing a liquid crystal composition that exhibits a cholesteric phase, the liquid crystal display element being driven by application of a voltage to the liquid crystal layer, the liquid crystal display being a reflective type liquid crystal display in which visible light of a particular wavelength is selectively reflected by changing the liquid crystal between focal conic and planar bistability states to form a display, wherein:
    the liquid crystal composition contains a mixture of a chiral material and nematic liquid crystal;
    a viscosity a [cP] of the liquid crystal composition is in a range from 30 to 150;
    a dielectric anisotropy b of the liquid crystal composition is in a range from 5 to 50;
    a thickness c [µm] of the liquid crystal layer is in a range from 3 to 8; and
    a product of a, b, and c is not less than 3500,
    wherein the liquid crystal display element is adapted to exhibit a stable focal conic state.

2. A liquid crystal display apparatus as claimed in claim 1, wherein the liquid crystal composition exhibits the cholesteric phase at room temperature or normal temperature.

3. A liquid crystal display apparatus as claimed in claim 1, wherein the product of a, b, and c is not less than 5000.

4. A liquid crystal display apparatus as claimed in claim 3, wherein the product of a, b, and c is not more than approximately 35000.

5. A liquid crystal display apparatus as claimed in claim 1, wherein the product of a, b, and c is not more than approximately 35000.

6. A liquid crystal display apparatus as claimed in claim 1, wherein the voltage is not more than approximately 40 V.

7. A liquid crystal display apparatus as claimed in claim 1, further comprising space maintaining members, provided between the pair of substrates, for maintaining a distance between the pair of substrates.

8. A liquid crystal display apparatus as claimed in claim 7, wherein the space maintaining members include a plurality of spherical spacers.

9. A liquid crystal display apparatus as claimed in claim 8, wherein each of the plurality of spherical spacers is coated with a thermoplastic resin.

10. A liquid crystal display apparatus as claimed in claim 9, wherein at least one of the pair of substrates is flexible.

11. A liquid crystal display apparatus as claimed in claim 8, wherein the space maintaining members further include a plurality of resin structures.

12. A liquid crystal display apparatus as claimed in claim 11, wherein at least one of the pair of substrates is flexible.

13. A liquid crystal display apparatus as claimed in claim 1, wherein the chiral material is contained in the liquid crystal composition in a range from 7 wt % to 40 wt %.

14. A multi-layered liquid crystal display element comprising a plurality of liquid crystal layers each of which is provided between a pair of substrates, at least one of the plurality of liquid crystal layers and a pair of the substrates sandwiching the at least one liquid crystal layer constituting the liquid crystal display element recited in claim 1.

15. A multi-layered liquid crystal display element as claimed in claim 14, wherein the plurality of layers carry out display in different colors, respectively.

16. A multi-layered liquid crystal display element as claimed in claim 14, wherein at least one of the substrates is shared by liquid crystal display layers adjacent to each other.

17. A liquid crystal display element as claimed in claim 1, wherein the liquid crystal composition contains a mixture of at least two different chiral materials and a nematic liquid crystal.

18. A liquid crystal display element as claimed in claim 1, wherein the dielectric anisotropy b of the liquid crystal composition is in a range from 15 to 50.

19. A liquid crystal display element comprising:
 a pair of substrates,
 space maintaining members, the space maintaining members being provided between the substrates,
 a visible light absorbing layer, the visible light absorbing layer being on a reverse surface of one of the substrates, and
 a liquid crystal layer, the liquid crystal layer being provided between the substrates, the liquid crystal layer containing a liquid crystal composition that exhibits a cholesteric phase, the liquid crystal composition containing a mixture of at least two different chiral materials and a nematic liquid crystal, the liquid crystal display element being driven by application of a voltage to the liquid crystal layer, the voltage being not more than approximately 40 V, the liquid crystal display being a reflective type liquid crystal display in which visible light of a particular wavelength is selectively reflected by changing the liquid crystal between focal conic and planar states, wherein:
 the liquid crystal composition contains a mixture of a chiral material and nematic liquid crystal;
 a viscosity a [cP] of the liquid crystal composition is in a range from 30 to 150;
 a dielectric anisotropy b of the liquid crystal composition is in a range from 5 to 50;
 a thickness c [$\mu$m] of the liquid crystal layer is in a range from 3 to 8; and
 a product of a, b, and c is not less than 3500,
 wherein the liquid crystal display element is adapted to exhibit a stable focal conic state.

* * * * *